United States Patent [19]

Takahashi et al.

[11] Patent Number: 5,264,895
[45] Date of Patent: Nov. 23, 1993

[54] FLASH LIGHTING CIRCUIT

[75] Inventors: Hiroshi Takahashi, Ishikawa; Kazuyuki Shimizu, Tokyo, both of Japan

[73] Assignee: Konica Corporation, Tokyo, Japan

[21] Appl. No.: 932,552

[22] Filed: Aug. 20, 1992

[30] Foreign Application Priority Data

Aug. 23, 1991 [JP] Japan .................. 3-237029

[51] Int. Cl.$^5$ .................. G03B 15/05; H05B 41/26
[52] U.S. Cl. .................. 354/415; 354/145.1; 315/240; 315/241 P
[58] Field of Search .............. 354/415, 145.1; 315/240, 241 P

[56] References Cited

U.S. PATENT DOCUMENTS

| | | | |
|---|---|---|---|
| 3,748,989 | 7/1973 | Ban | 315/241 P X |
| 3,758,817 | 9/1973 | Elliot | 315/240 X |
| 4,255,046 | 3/1981 | Corona | 315/241 P |
| 4,467,248 | 8/1984 | Watanabe | 315/241 P |
| 4,881,013 | 11/1989 | Kataoka et al. | 354/415 X |
| 4,908,552 | 3/1990 | Kumakura | 315/241 P |

Primary Examiner—W. B. Perkey
Attorney, Agent, or Firm—Finnegan, Henderson, Farabow, Garrett & Dunner

[57] ABSTRACT

To provide a small-sized and inexpensive flash lighting circuit for a camera capable of fully reducing red eyes reflection, a sub capacitor, a main capacitor and a flash discharge tube are connected in parallel to a DC-DC converter, whereby the sub capacitor is directly connected to the DC-DC converter, the main capacitor is connected to the above parallel connected line through a first diode which prevents the charge of the main capacitor from flowing into the flash discharge tube to allow preliminary lighting, the thyristor for changing over preliminary lighting and main lighting is disposed between the main capacitor and the flash discharge tube on a bypass line led out from the junction point of the main capacitor and the first diode, and a second diode, which prevents the charge of the main capacitor flowing into the sub capacitor after the sub capacitor has been first discharged at the time of main lighting, is disposed on the above parallel connected line between the cathode of the thyristor and the sub capacitor.

3 Claims, 5 Drawing Sheets

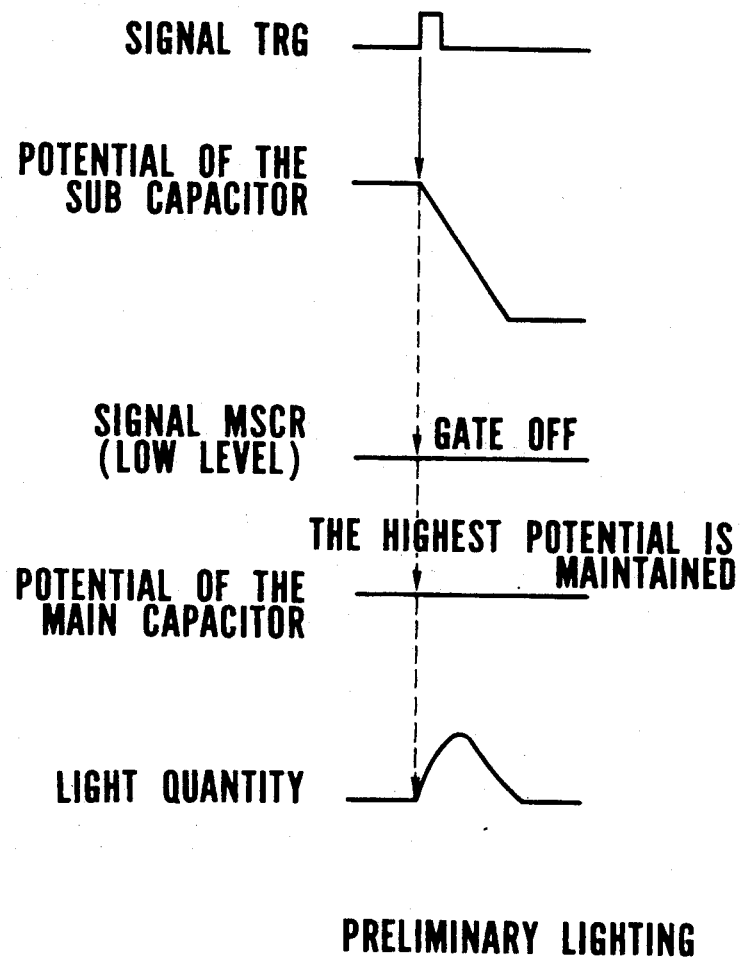

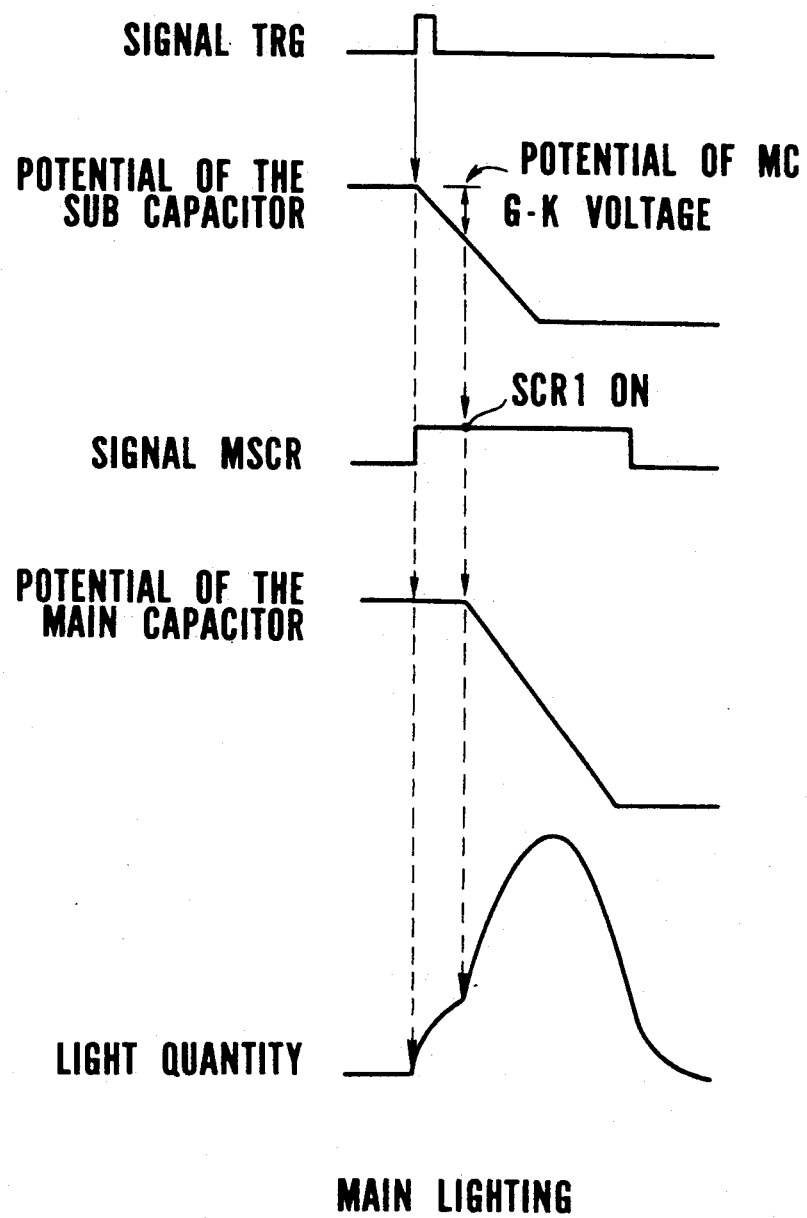

FLASH LIGHTING CIRCUIT

BACKGROUND OF THE INVENTION

1. Field of the Invention

The present invention relates to a flash lighting circuit which is installed in a camera and emits a flashlight in photography.

2. Description of the Prior Art

Most of recently developed cameras are provided with a flash lighting circuit capable of photographing on a film of a specified sensitivity even when a brightness of a subject to be photographed is small, for example, at night. Electronic cameras using such flash lighting circuit for automatic exposure control have been put into practical use which measures a brightness of the subject with flash lighting immediately before photographing, sets exposing conditions such as a diaphragm value, shutter speed, etc. based on the result of measurement, and exposes the film by another flash lighting under the above described exposure conditions. Hereafter flash lighting before photographing is referred to as "preliminary lighting" and flash lighting in photographing is referred to as "main lighting".

The flash lighting circuit of such electronic camera is provided with a small capacity sub capacitor SC for preliminary lighting and a large capacity main capacitor MC for main lighting, as shown in FIG. 1, to quickly shift the operation to the main lighting by reducing a charging time after preliminary lighting. Only the sub capacitor SC is discharged to make preliminary lighting, the sub capacitor SC is immediately charged, and both the sub capacitor SC and the main capacitor MC are discharged to make main lighting and then charged for next flash photography.

The following describes in detail the above lighting operation. For preliminary lighting, the lighting changeover thyristor SCR1 is kept off with a lighting changeover signal (MSCR) and a circuit between the main capacitor MC and a flash discharge tube Xe in which xenon gas is sealed is disconnected. When the trigger thyristor SCR2 is turned on with a trigger signal (TRG) under this condition, a charge stored in a trigger capacitor TC flows into a trigger transformer TT, a high voltage is produced at the secondary side of the trigger transformer TT and applied to the trigger electrode provided on the wall of the flash discharge tube Xe to activate xenon gas in the discharge tube and the resistance of the discharge tube is reduced. In this case, since the circuit between the main capacitor MC and the flash discharge tube Xe is kept disconnected, only charge stored in the sub capacitor SC is discharged and a flash is emitted. This emission is the preliminary lighting.

On the other hand, for main lighting, the lighting changeover thyristor SCR1 and the trigger thyristor SCR2 are turned on at the same time. Then, both the main capacitor MC and the sub capacitor SC electrically connects to the flash discharge tube Xe and the charge stored in both capacitors is discharged into the flash discharge tube Xe to make flash lighting.

Charging is done as described below. Specifically, the DC-DC converter CT boosts a power supply voltage (6V) from a battery E according to a charging control signal (charging start signal START) and applies a high voltage (250V) to the main capacitor MC and the sub capacitor SC to charge these capacitors. When the main capacitor MC and the sub capacitor SC are charged up to the rated capacity, a Zener current begins to flow in the Zener diode ZD and is outputted as a charging detection signal (FULL) to the control part, not shown, through a resistor R1. The control part outputs the charging control signal (charging stop signal STOP) to the DC-DC converter in accordance with the charging detection signal to stop charging.

Charging of the sub capacitor SC is enabled with the charging resistor R2. Specifically, if the charging resistor R2 is not provided, the circuit between the sub capacitor SC and the DC-DC converter CT is disconnected with the lighting changeover thyristor SCR1 and therefore the sub capacitor SC cannot be charged. In this case, the circuit between the sub capacitor SC and the DC-DC converter CT is connected with the charging resistor R2 so that a high voltage of the DC-DC converter CT can be applied to the sub capacitor SC through the charging resistor R2.

Lately, electronic cameras each being provided with the flash lighting circuit has also tendency to be made in an extremely compact design. However, if the camera is made compact, distance between the flash lighting window and the photographing lens is short and therefore, when a flash light enters into eyes of a subject person in flash lighting photography, the flash light is reflected as red light from capillary vessels on the retina and the so-called red eyes phenomenon that pupils in color photography appear in red will often occur.

For this reason, electronic cameras which are intended to reduce such red eyes reflection have been materialized which are adapted to cause size of the pupils to be instantaneously made smaller upon preliminary lighting by the flash lighting circuit and make the main lighting before the pupils recover their former size. Currently, the preliminary lighting has been demanded to be commonly used both in automatic exposure control and reduction of red eyes.

However, the conventional flash lighting circuit which is primarily constructed to perform preliminary lighting for automatic exposure control requires more charging time because the sub capacitor SC needs to be charged through the charging resistor R2. Therefore the charging of the sub capacitor SC cannot be finished within an appropriate duration of time (0.7 to 1.3 seconds) to reduce the red eyes reflection, the main lighting is carried out with lapse of a longer time than the above, the pupils open large at the time of main lighting and the red eyes reflection could not be fully reduced. Particularly, if the power supply voltage falls, the charging time will be further longer.

For main lighting by the main capacitor MC and the sub capacitor SC, the sub capacitor SC of a small capacity is discharged up earlier than the main capacitor and, when the resistance value of the sub capacitor SC becomes approximately 0Ω, a charging current from the main capacitor MC begins to flow in the sub capacitor SC and the lighting changeover thyristor SCR1. The charging current at the initial moment of flowing is extremely large and therefore the lighting changeover thyristor SCR1 should be a large and expensive type which substantially hinders a compact design and low price of the camera.

SUMMARY OF THE INVENTION

The present invention has been made in view of the above described problems and it is an object of the present invention to simplify in a compact design the circuit configuration of the flash lighting circuit which performs the preliminary flash lighting with the small capacity sub capacitor and the main flash lighting with both the small capacity sub capacitor and the large capacity main capacitor, and it is another object of the present invention to reduce the charging time of the small capacity sub capacitor, in a type of flash lighting circuit which performs the preliminary lighting and subsequently the main lighting to reduce the red eyes reflection and obtain an appropriate exposure in flash photography.

To achieve the above objects, the circuit according to the present invention has a DC-DC converter, a small capacity sub capacitor, a large capacity main capacitor, a flash discharge tube and thyristors. In the flash lighting circuit which changes over the preliminary flash lighting for making the flash discharge tube emit a flash by discharging only the sub capacitor and the main flash lighting for making the flash discharge tube emit a flash by discharging the sub capacitor and the main capacitor by switching an operation of the above described thyristor, the sub capacitor, the main capacitor and the flash discharge tube are connected in parallel to the DC-DC converter, whereby the sub capacitor is directly connected to the DC-DC converter, the main capacitor is connected to the above parallel connected line through the first diode which prevents the charge of the main capacitor from flowing into the flash discharge tube to allow preliminary lighting, the thyristor is disposed between the main capacitor and the flash discharge tube on the bypass line led out from the junction point of the main capacitor and the first diode, and the second diode, which prevents the charge of the main capacitor flowing into the sub capacitor after the sub capacitor has been first discharged at the time of main lighting, is disposed on the above parallel connected line between the cathode of the thyristor and the sub capacitor.

The route where the charge of the main capacitor flows into the flash discharge tube through the parallel connected line is always blocked by the first diode. While the by pass line route to the flash discharge tube is blocked by turning off the thyristor and the route between the main capacitor and the flash discharge tube is blocked, the second diode disposed on the parallel connected line between the cathode of the thyristor and the sub capacitor is forward to the flash discharge tube and the route where the charge of the sub capacitor flows into the flash discharge tube is made conductive and therefore the preliminary lighting is enabled only by discharging the sub capacitor. The sub capacitor is directly connected to the DC-DC converter without through a charging resistor and charging of the sub capacitor carried out by the DC-DC converter after preliminary lighting is quickly completed within an appropriate time during which the red eyes reflection are substantially reduced.

The route where the charge of the main capacitor flows into the flash discharge tube is made conductive by turning on the thyristor on the bypass line and the main lighting is enabled by discharging the main capacitor and the sub capacitor. In case of the main lighting, the sub capacitor of small capacity finishes discharging earlier than the large capacity main capacitor. When the discharging of the sub capacitor is nearly finished, the charge of the main capacitor is prevented from flowing into the sub capacitor and being charged therein by the diodes 1 and 2. Thus the circuit is constructed to prevent a large charging current from flowing into the thyristor when the discharging of the sub capacitor is nearly finished and therefore inexpensive small-sized thyristors for a small current can be employed.

BRIEF DESCRIPTION OF THE DRAWINGS

FIG. 4 is a timing chart showing preliminary lighting operation; and

FIG. 5 is a timing chart showing main lighting operation in accordance with the present invention.

DETAILED DESCRIPTION OF PREFERRED EMBODIMENTS

An embodiment of the present invention is described below, referring to the accompanying drawings.

Figure 2:
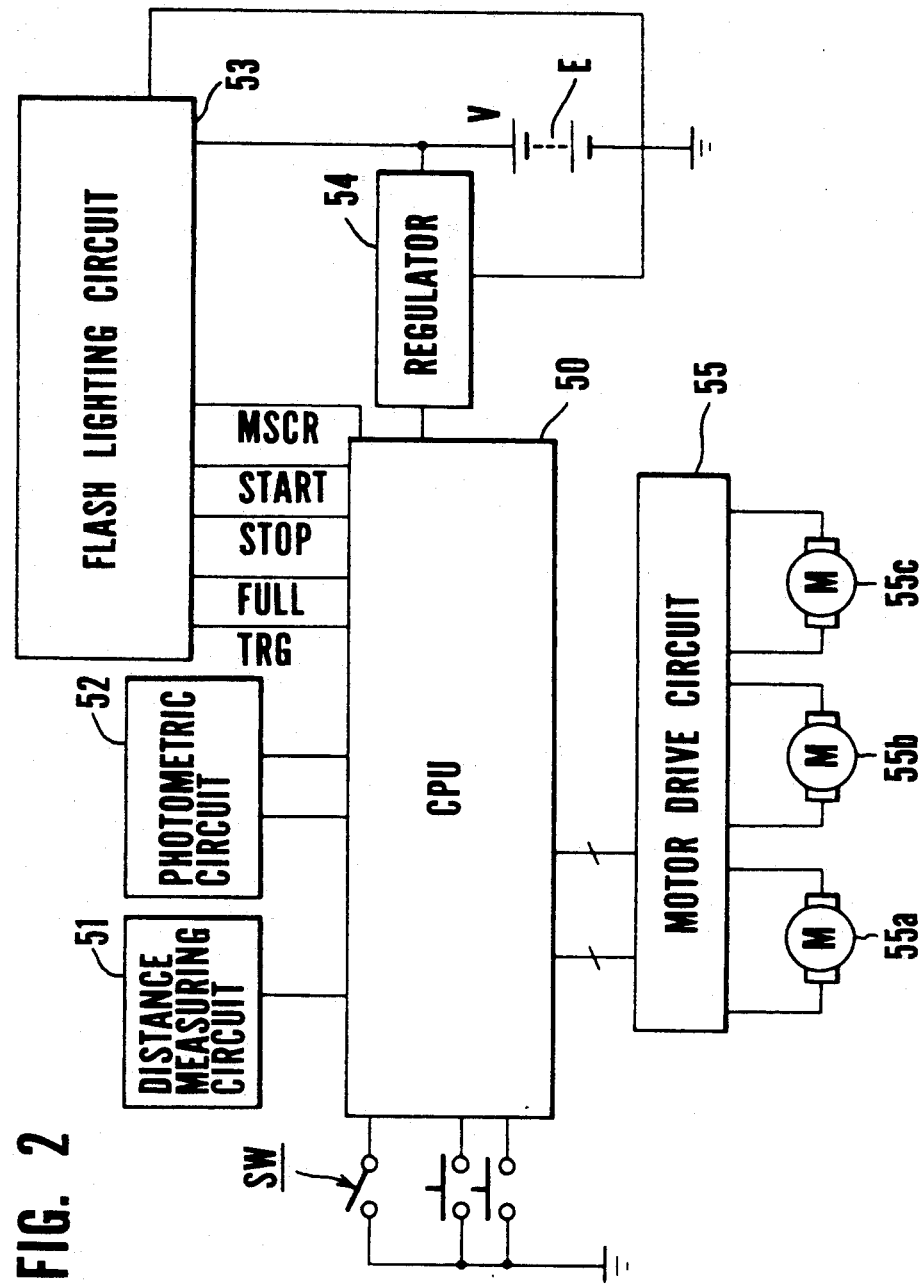
FIG. 2 is an electrical circuit configuration of an electronic camera provided with a flash lighting circuit according to an embodiment of the present invention.

FIG. 2 shows an electrical circuit configuration of a small-sized electronic camera. This small-sized camera is constructed to control a series of photographing sequence with a CPU 50 serving as a central control component, and the CPU 50 is connected with a distance measuring circuit 51 for measuring a distance up to a subject, a photometric circuit 52 for measuring a brightness of a subject, a flash lighting circuit 53 according to an embodiment of the present invention, a regulator 54 for regulating a voltage from a battery E to a constant voltage and supplying it to the CPU 50, a motor drive circuit 55 for driving and controlling a lens drive motor 55a, a shutter drive motor 55b and a film feed motor 55c, and switches such as the power ON/OFF main switch and the mode selector switch for selecting various modes such as a flash photographing mode.

Figure 1:
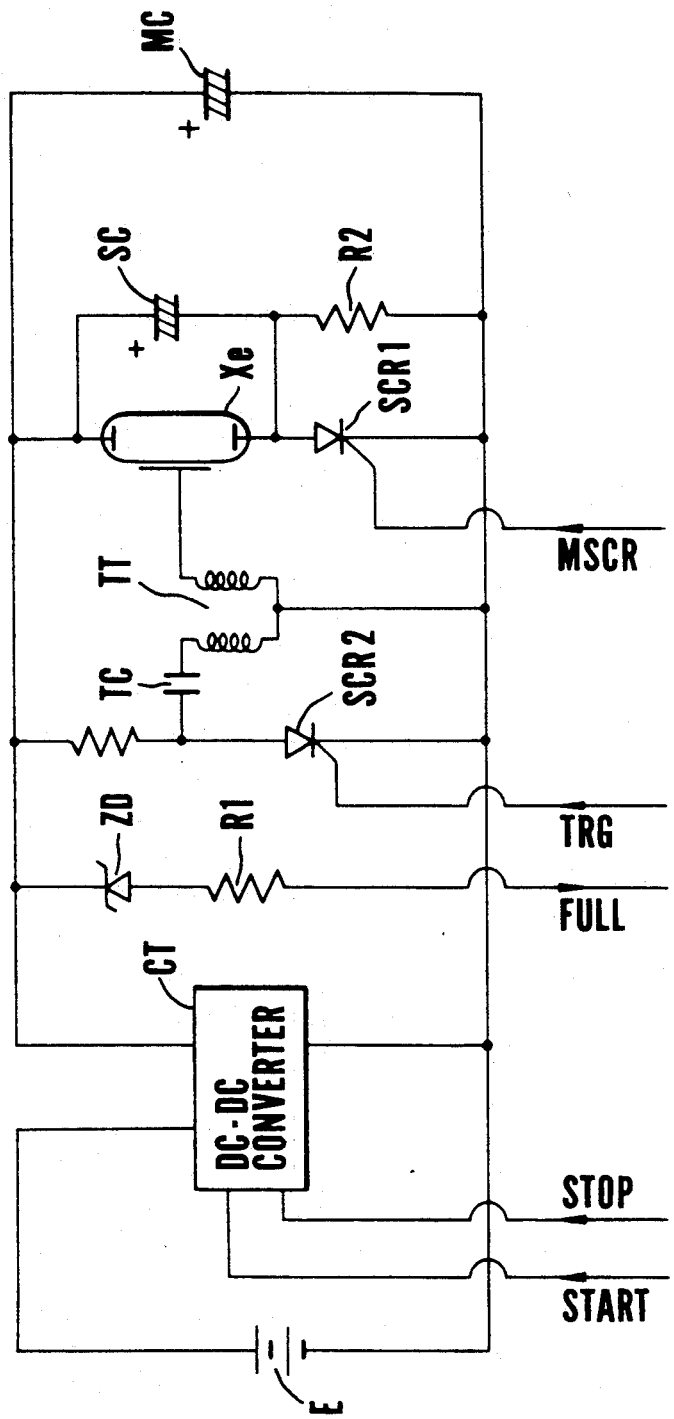
FIG. 1 is a circuit diagram of a conventional flash lighting circuit.
Figure 3:
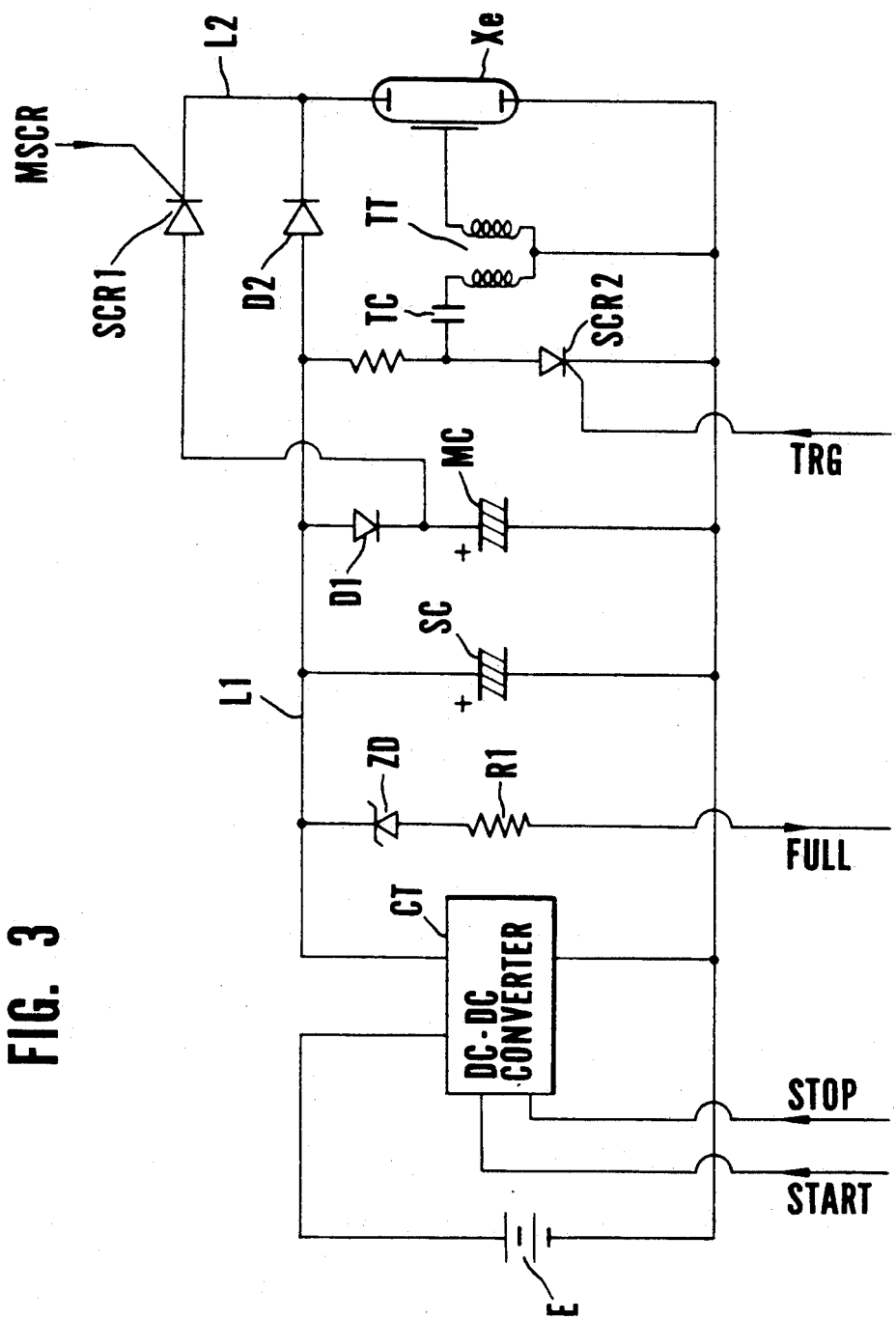
FIG. 3 is a detailed circuit diagram of a flash lighting circuit in an electrical circuit of an electronic camera shown in FIG. 2.

The CPU 50 determines various photographing conditions on the basis of ON/OFF signals of switches and signals from the distance measuring circuit 51 and the photometric circuit 52, outputs various control signals to the flash lighting circuit 53 and the motor drive circuit 55 in accordance with the result of such determination and makes the camera carry out photographic operations. In this case, the CPU 50 controls the flash lighting circuit 53 to carry out a flash photographing by making the flash lighting circuit 53 emit a flash when a flash photography mode is set or the brightness of a subject measured by the photometric circuit 52 is less than specified value even though the flash photography mode is not set. In addition, in case of flash photography, the preliminary lighting is given at all times before flash photography to reduce the red eyes reflection and to automatically set the exposure conditions. FIG. 3 is a detailed view of the flash lighting circuit 53 shown in FIG. 2 and the same components shown in FIG. 3, as those of the conventional flash lighting circuit shown in FIG. 1, are given the identical symbols and numerals.

However the main capacitor MC and the flash discharge tube Xe, including the sub capacitor SC, are connected in parallel to the DC-DC converter CT by the parallel connected line, the flash lighting circuit 53 according to the present invention differs from the conventional flash lighting circuit in the following points. Specifically, the charging resistor R2 which has conventionally been used to charge the sub capacitor SC is not provided and the sub capacitor SC is directly connected to the DC-DC converter. The main capacitor MC is connected to the parallel connected line L1 through the diode D1. The lighting changeover thyristor SCR1 is disposed on the bypass line L2 which is led out from the junction point of the plus terminal of the main capacitor MC and the cathode terminal of the diode D1 and connected to the flash discharge tube Xe and the cathode terminal of the thyristor SCR1 is connected to the anode terminal of the flash discharge tube Xe. In addition, the diode D2 is provided on the parallel connected line L1 between the plus terminal of the sub capacitor SC and the cathode terminal of the lighting changeover thyristor SCR1. Electrolytic capacitors of approximately 42μ F and 250 μ F are used as the sub capacitor SC and the main capacitor MC.

As described above, the sub capacitor SC and the DC-DC converter are directly connected without a charging resistor therebetween and therefore the charging of the sub capacitor SC by the DC-DC converter after preliminary lighting can be finished within a short period of time (within 0.7 seconds) and the main lighting can be carried out at a timing with lapse of an appropriate time for reduction of red eyes reflection after preliminary lighting.

The following describes the lighting operation of the flash lighting circuit 53.

For preliminary lighting, the CPU 50 supplies a low level lighting changeover signal MSCR to the gate of the lighting changeover thyristor SCR1 so that the lighting changeover thyristor SCR1 is kept off as shown in FIG. 4 and turns on the trigger thyristor SCR2 with a trigger signal TRG. Then the circuit between the main capacitor MC and the flash discharge tube Xe is disconnected by the lighting changeover thyristor SCR1 on the bypass line L2 and also by the diode D1 on the parallel connected line L1, but the circuit between the sub capacitor SC and the flash discharge tube Xe (parallel connected line L1) is connected by the diode D2, therefore only the charge of the sub capacitor is supplied to the flash discharge tube Xe and the flash is emitted. Thus, the diode D1 is used to allow the preliminary flash lighting only with the sub capacitor SC.

On the other hand, for the main lighting, as shown in FIG. 5, the CPU 50 supplies a high level lighting changeover signal MSCR (specified voltage) to the gate of the lighting changeover thyristor SCR1 to make this thyristor ready to turn on and turns on the trigger thyristor SCR2 with a trigger signal TRG. In this case, since the resistance of the flash discharge tube Xe until the trigger signal TRG is supplied is extremely large, the circuit of the route of the main capacitor MC→lighting changeover thyristor SCR1 flash discharge tube Xe is not formed and the lighting changeover thyristor SCR1 is not forward-biased. In other words, the lighting changeover thyristor SCR1 is still kept off and the by pass line L2 is blocked. Accordingly, the flash lighting is started by discharging the sub capacitor SC. With this flash lighting, a circuit is formed between the main capacitor MC and the lighting changeover thyristor SCR1 and the flash discharge tube Xe and the lighting changeover thyristor SCR1 is forward-biased by the main capacitor MC. The potential at the cathode of the lighting changeover thyristor SCR1 reduces along with the progress of discharging of the sub capacitor SC and the potential difference between the gate and the cathode of lighting changeover thyristor SCR1 becomes gradually large to turn on the lighting changeover thyristor SCR1 and flash lighting by discharging of the main capacitor MC is started. Thus, the discharging of the main capacitor MC is started after discharging of the sub capacitor SC has been started and the light quantity of the flash is as shown in FIG. 5.

When the discharging of the sub capacitor SC is finished in the conventional flash lighting circuit shown in FIG. 1, the sub capacitor SC is charged by the main capacitor MC and a large current flows in the lighting changeover thyristor SCR1 at the starting moment of this charging. However, in the flash lighting circuit 53 of the present invention, discharging of the main capacitor MC to the sub capacitor SC is blocked by the diodes D1 and D2. Accordingly, a large charging current does not flow in the lighting changeover thyristor SCR1 when the discharging of the sub capacitor SC is nearly finished, unlikewise the conventional circuit, and therefore small-sized inexpensive thyristors for small currents can be used as the lighting changeover thyristor SCR1. In addition, there is no fear that the charge of the main capacitor MC flows also in the sub capacitor SC, the charge quantity flowing into the flash discharge tube reduces thereof and the photography is done with an insufficient exposure. Moreover, a wasteful use of the charge of the main capacitor MC due to charging of the subcapacitor is eliminated and the main capacitor MC to be used can be small-sized with a small capacity. Also in this point, the camera can be made more compact.

As described above, in a type of the flash lighting circuit which performs flash emission for preliminary lighting with a small capacity sub capacitor and for main lighting both with the above described small capacity sub capacitor and with a large capacity main capacitor, the present invention allows to use a small-sized inexpensive thyristor for a small current as the thyristor for changing over preliminary lighting and main lighting, simplify the circuit configuration, obtain a remarkable effect for miniaturization of the flash device, and reduce the charging time of a small capacity sub capacitor, thus materializing the flash lighting circuit suited to reduce the red eyes reflection.

What is claimed is:

1. A flash lighting circuit comprising a DC-DC converter; a small capacity sub capacitor; a large capacity main capacitor, a flash discharge tube; and a thyristor, for changing over preliminary lighting for which said flash discharge tube is made to emit a flash by discharging only said sub capacitor and main lighting for which said flash discharge tube is made to emit a flash by discharging said sub capacitor and said main capacitor with a switching operation of said thyristor, wherein said sub capacitor, said main capacitor and said flash discharge tube are connected in parallel to said DC-DC converter, whereby said sub capacitor is directly connected to said DC-DC converter, said main capacitor is connected to the above parallel connected line through a first diode which prevents the charge of said main capacitor from flowing into said flash discharge tube to allow preliminary lighting, said thyristor is disposed between said main capacitor and said flash discharge tube on a bypass line led out from the junction point of said main capacitor and said first diode, and a second diode, which prevents the charge of said main capacitor from flowing into said sub capacitor after said sub capacitor has been first discharged at the time of main lighting, is disposed on said above parallel connected line between the cathode of said thyristor and said sub capacitor.

2. A flash lighting circuit according to claim 1, wherein said main capacitor and said sub capacitor are respectively an electrolytic capacitor.

3. A flash lighting circuit according to claim 1, wherein a trigger thyristor for starting preliminary lighting and main lighting is connected in parallel with said flash discharge tube through a resistor to said parallel connected line.

* * * * *